(12) United States Patent
Joly et al.

(10) Patent No.: US 9,002,063 B2
(45) Date of Patent: Apr. 7, 2015

(54) METHOD FOR IDENTIFYING AND DEFINING BASIC PATTERNS FORMING THE TREAD PATTERN OF A TYRE

(75) Inventors: Alexandre Joly, Clermont-Ferrand Cedex (FR); Jean-Paul Zanella, Clermont-Ferrand Cedex (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 176 days.

(21) Appl. No.: 13/878,526

(22) PCT Filed: Oct. 6, 2011

(86) PCT No.: PCT/EP2011/067470
§ 371 (c)(1),
(2), (4) Date: Apr. 18, 2013

(87) PCT Pub. No.: WO2012/052300
PCT Pub. Date: Apr. 26, 2012

(65) Prior Publication Data
US 2013/0208949 A1 Aug. 15, 2013

(30) Foreign Application Priority Data
Oct. 19, 2010 (FR) ...................................... 10 58524

(51) Int. Cl.
*G06K 9/00* (2006.01)
*G01M 17/02* (2006.01)
*G06T 7/00* (2006.01)

(52) U.S. Cl.
CPC ............ *G01M 17/02* (2013.01); *G01M 17/027* (2013.01); *G06T 7/0004* (2013.01)

(58) Field of Classification Search
USPC ........... 73/8, 146; 152/154.2, 209.1; 382/103, 382/141, 152
See application file for complete search history.

(56) References Cited

U.S. PATENT DOCUMENTS

| 6,523,586 | B1* | 2/2003 | Eromaki et al. | ............ 152/154.2 |
| 2009/0008009 | A1* | 1/2009 | Mosko et al. | ............ 152/154.2 |
| 2011/0013823 | A1* | 1/2011 | Joly | .............................. 382/141 |
| 2012/0010776 | A1* | 1/2012 | Paturle | .......................... 701/31.5 |

FOREIGN PATENT DOCUMENTS

WO WO 2009/077537 A1 6/2009

OTHER PUBLICATIONS

D. Savéry, "Notes du Chapitre II: Intégrales de convolution et de corrélation," Cours ELE3700, Analyse des signaux, École Polytechnique de Montréal, Département de génie électrique, pp. 1-7 (2002).

* cited by examiner

*Primary Examiner* — Gregory F Cunningham
(74) *Attorney, Agent, or Firm* — Fitzpatrick, Cella, Harper & Scinto (57) ABSTRACT

A tire tread, having circumferentially juxtaposed elements separated from one another by identically shaped boundaries and having a least one basic pattern, is inspected by: producing an image of the tire tread; identifying tread wear indicators on the image; grouping together sub-sets of the indicators according to the basic pattern(s) included in the indicators; determining a characteristic point of each of the sub-sets of the indicators; determining a sequence of distances by computing distances between the characteristics points of each of the sub-sets of the indicators; comparing and the sequence of distances with a known sequence of distances between characteristic points of the basic pattern(s) to confirm coincidence thereof; and projecting a shape of a boundary between elements of the tire tread onto a surface to be inspected according to the known sequence of distances between characteristic points of the basic pattern(s).

14 Claims, 7 Drawing Sheets

METHOD FOR IDENTIFYING AND DEFINING BASIC PATTERNS FORMING THE TREAD PATTERN OF A TYRE

FIELD OF THE INVENTION

The invention relates to the field of the visual inspection of tyres in which the image of a tyre to be inspected is compared with a reference image of this tyre.

The comparison of these two images makes it possible, by analysis of the differences, to determine, at a given point of the image, the variations in the value of a physical magnitude assigned to this point and originating from a generally digital image sensor. The physical magnitudes measured by the sensor may be relative to the colour, to the brightness, to the texture of the observed object or else to the height of the points relative to a reference surface, when a material is used that is capable of creating a three-dimensional image.

These variations are analysed with the aid of algorithms that are not the subject of the present description and are adapted to determine the degree of conformity of the tyre to be inspected, and to decide whether this tyre can be considered as conforming or whether it must be directed towards a treatment centre.

In the case of the tyre, this technique is applied for the inspection of the tyre zones obtained by moulding based on a rigid die such as the sidewall or the tread.

BACKGROUND

Publication WO2009077537 describes a method that is specially adapted to the inspection of tyre treads of which the tread pattern is formed by the assembly of elements having basic patterns, in reduced numbers, juxtaposed circumferentially and sequenced in a precise and determined manner.

The basic patterns of the tread pattern have similar shapes and have dimensions that are similar but not totally identical. Each type of basic pattern therefore appears several times on the circumference of the tread pattern of the casing. The choice of dimensions and the arrangement of the basic patterns are carried out in a judicious manner known to those skilled in the art for the purpose of reducing the running vibrations or noises.

The object of the method described in the publication cited above consists in comparing the reference images of only the basic patterns with the image of the real basic patterns placed on the circumference of the tyre.

It is therefore sufficient to acquire the image of the tread of a single tyre in order to obtain a sufficient collection of images of each of the basic patterns and to compute the reference images from these basic patterns by making the assumption that an anomaly is not likely to occur on all of the elements having an identical basic pattern.

Also, prior to the implementation of this method, it is necessary to identify and to locate in a precise manner the limits between the elements forming the tread pattern.

BRIEF DESCRIPTION OF THE INVENTION

The object of the present invention is to propose a method making it possible to solve this problem.

The method for inspecting the tread according to the invention is intended for the inspection of the tread of a tyre of which the tread pattern is formed by the assembly of elements that are juxtaposed circumferentially, separated from one another by boundaries with identical shapes, and having basic patterns, in reduced number sequenced in a precise and known manner, comprising at least one basic pattern on which tread wear indicators are placed with which are associated a characteristic point of this basic pattern.

This method comprises the following steps during which:
an image of the tyre tread to be inspected is produced,
the tread wear indicators that are present on the image of the tyre tread to be inspected are identified,
the tread wear indicators are grouped together by sub-sets corresponding to the basic pattern comprising tread wear indicators and the characteristic point of each of these sub-sets is determined,
a sequence of distances is determined by computing the distances between the characteristics points of each of the sub-sets of tread wear indicators identified on the tread surface to be inspected,
this sequence of distances is made to coincide with the known sequence of the distances between the characteristic points of the basic patterns,
the shape of the boundary between the elements is projected onto the surface to be inspected according to the known sequence of positioning of the said elements.

The value of this method is that it makes it possible to identify with certainty the sequence of the elements of the tyre tread pattern to be inspected and to assign to each element the basic pattern corresponding thereto. This method also has the advantage of taking not much computation time compared with the methods of adjusting or of superposition by optimizing the distances of the contours of the tread patterns.

Once this step is completed, it is possible to carry out without difficulty an evaluation method as described for example in publication WO2009077537.

As a general rule, the tread pattern comprises a single basic pattern including tread wear indicators.

According to a first embodiment of the method, the identification of the tread wear indicators is carried out on the basis of reference thumbnail images of the tread wear indicators, which thumbnail images are adapted to the dimension to be inspected.

According to a second embodiment of the method, the identification of the tread wear indicators is carried out on the basis of the digital model used as a basis for the definition of the tyre tread pattern.

In order to restrict the computation time and increase the reliability of the search, it is possible to limit the search for the tread wear indicators to narrow circumferential strips substantially framing the grooves of the tread pattern in which the said tread wear indicators are situated.

It may be found necessary to deform the image of the tread wear indicators of the digital model according to the calibration parameters of the means for acquiring the image of the tyre tread to be inspected before carrying out the identification of the tread wear indicators.

In order to refine the search and improve the matching of the shapes of the tread wear indicators, it may be useful to deform the image of the tread wear indicators of the digital model by applying an affine transformation.

The method also makes it possible to evaluate the distance between the transverse position of the characteristic points of the elements containing tread wear indicators and a longitudinal direction so as to determine the run-out of the tyre over the whole of its circumference.

It is then possible to correct the transverse position of the boundaries between elements as a function of the value of the run-out of the tyre at this point of its circumference.

BRIEF DESCRIPTION OF THE DRAWINGS

The following description will make it possible to better understand the invention and its variant embodiments and is based on FIGS. 1 to 12 in which.

DETAILED DESCRIPTION OF THE INVENTION

Figure 1:
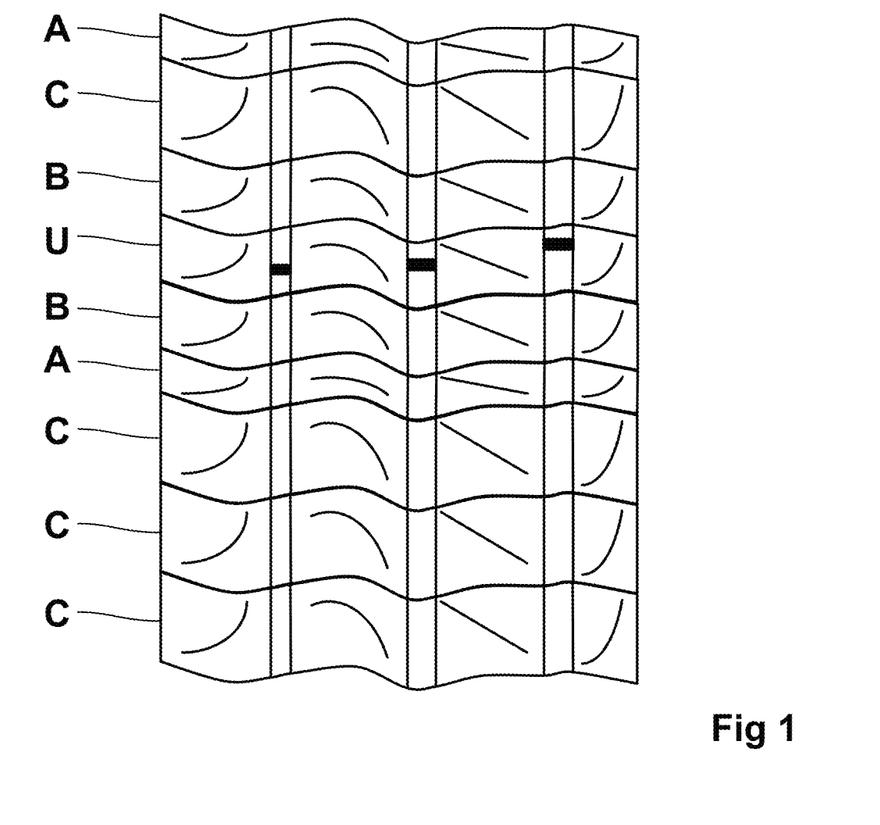
FIG. 1 represents a schematic view of a tread formed by the juxtaposition of elements having basic patterns.

FIG. 1 makes it possible to visualize a portion of tyre tread on which can be seen the presence of several types of basic patterns, marked respectively A, B, C and U. These types of basic patterns are represented individually in FIG. 2 and comprise for example 3 patterns A, B and C of different lengths and one pattern U containing the tread wear indicators. These four types of basic pattern will be repeated in a precise sequence all along the circumference of the tyre.

Thus, the sequence of the tread portion illustrated in FIG. 1 is a sequence marked ACBUBACCC, and, for a given dimension of this tyre range, the final sequence will be formed by the juxtaposition of these four types of basic pattern, arranged in a complex and known sequence, beginning with ACBUBACCC and continuing for example through the patterns BCAABUAABCBCBAAABBUCACAACBAACBBAU etc.

As a general rule, a dimension may have from one to five basic patterns and a tread comprises, depending on the diameters, the repetition of eighty to one hundred basic patterns, arranged in the desired sequence. The result of this is that a given type of basic pattern, for example the basic pattern A, will be used, depending on the dimensions and the type of tread pattern, between ten and forty times per tread.

The shape of the transverse boundaries of each of the types of basic pattern is adapted to be able to match indistinctly the transverse boundary of any basic pattern of another type. Therefore, the shape of these boundaries is identical irrespective of the basic pattern in question in order to make it possible to modify the sequence of basic patterns as required.

Figure 2:
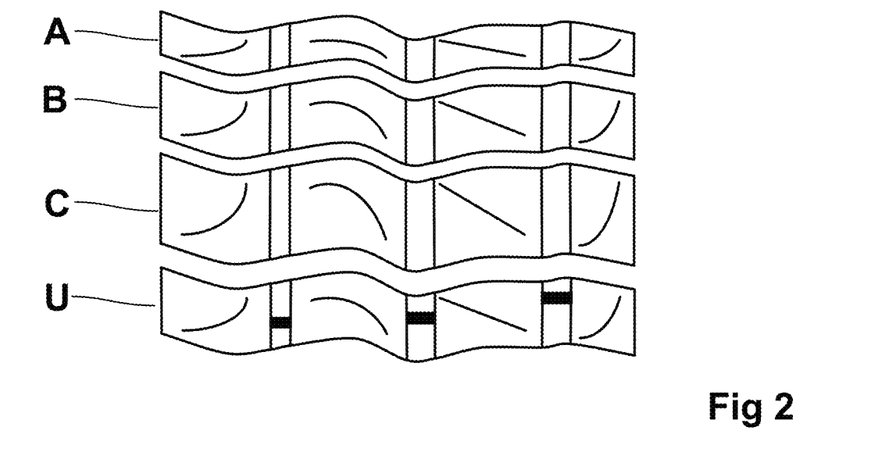
FIG. 2 represents the four basic patterns used to generate the tread pattern illustrated in FIG. 1.

The basic patterns shown in FIG. 2 occupy the whole transverse width of the tread. This arrangement is not limiting, and the principles of the invention may be extended to the situation in which the tread pattern comprises several different basic patterns placed on one and the same transversal. This is the case in particular with tread patterns known as asymmetrical.

The basic pattern marked U comprises tread wear indicators placed in the longitudinal groove. This particular basic pattern is usually unique and can be reproduced as many times as necessary in the basic pattern sequence of the tread pattern. It is this particular feature that will be used to determine the boundaries between the elements of the tread pattern while furthermore considering that the presence of the tread wear indicators is mandatory irrespective of the type of tread pattern.

The first operation to carry out therefore consists in producing an image of the tread surface of the tyre to be inspected.

"Image" means the information originating from one or more sensors sensitive to the light reflected, at a given point, by the tyre to be examined. This image may be two- or three-dimensional, gray level, monochrome, or in colour. It may come from a linear camera, a grey-level or colour matrix camera or else laser triangulation sensors etc. Associated with each pixel of the image is the value of one or more physical magnitudes. An image therefore takes the form of as many data tables as there are measured physical magnitudes.

The next step then consists in identifying the tread wear indicators that are present in the image of the tread of the tyre to be inspected.

The present description will be limited to the explanation of two possible methods for carrying out this operation.

Figure 3:
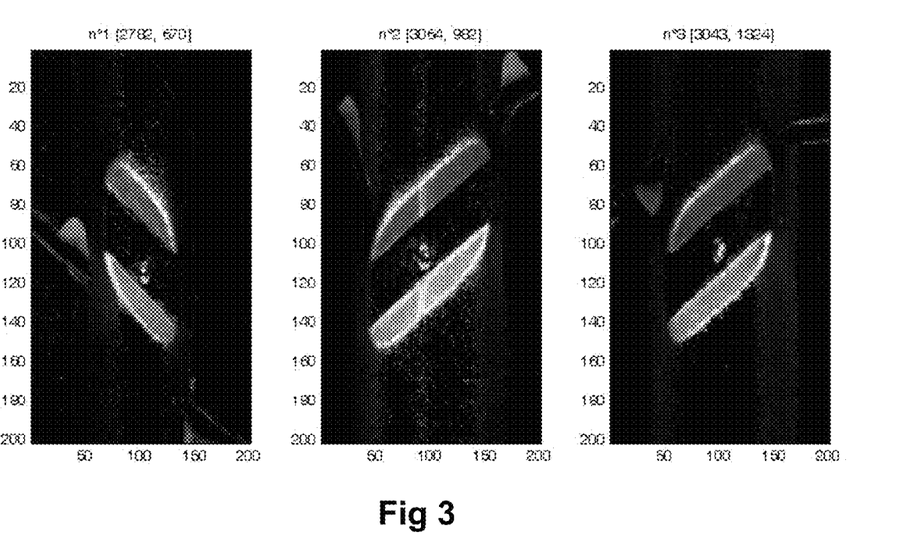
FIG. 3 represents the thumbnail images in 2D of reference tread wear indicators.

A first method, particularly well suited to the processing of two-dimensional data, consists in manually acquiring reference thumbnail images of the tread wear indicators that are present on the tread of a tyre of the same dimension considered to be a reference tyre. It would be equally possible to use thumbnails or 3D models of tread wear indicators of which the shape is identical or sufficiently close to that of the tread wear indicators of the dimension to be inspected, when for example these thumbnail images originate from a tyre of the same range but with different dimensions. These images, shown in FIG. 3, are then stored in memory.

During this learning phase, it is equally possible, for one and the same basic pattern, to store other items of information (illustrated in FIG. 7), such as:
  the individual positions of the tread wear indicators TU1, TU2, TU3,
  the distances between the tread wear indicators (A1, A2, D1, D2),
  the position of a characteristic point P of the sub-set of tread wear indicators belonging to the said basic pattern comprising the tread wear indicators; what is meant here by a characteristic point is a significant point defined conventionally for the tyre dimension and easily identifiable from the sub-set of tread wear indicators belonging to the basic pattern comprising the tread wear indicators. This characteristic point may, for example, be the centre of gravity of the surfaces of the tread wear indicators, or else of the centre of these surfaces or any other point obtained from the image of a single or of several tread wear indicators belonging to the said basic pattern comprising the tread wear indicators.
  the shape of the cut-out of an element corresponding to the boundaries of the element or of the basic pattern, and the relative position of these boundaries relative to
  the tread wear indicators and relative to the characteristic point.

Certain of these items of information, which may be extracted directly from the design data of the mould, will be useful subsequently for making more robust the identification of the tread wear indicators on the surface to be inspected.

Also stored are:
- the circumferential distances separating the basic patterns U comprising the tread wear indicators TU and which correspond to the circumferential distance between the characteristic points P of the said basic patterns U comprising the tread wear indicators. These distances are the signature of a particular sequence corresponding to the circumferential sequencing of the basic elements since the distribution of the basic patterns between two patterns containing tread wear indicators is known,
- the circumferential distances between the boundaries of each element corresponding substantially to the circumferential length of a basic pattern.

Figure 4:
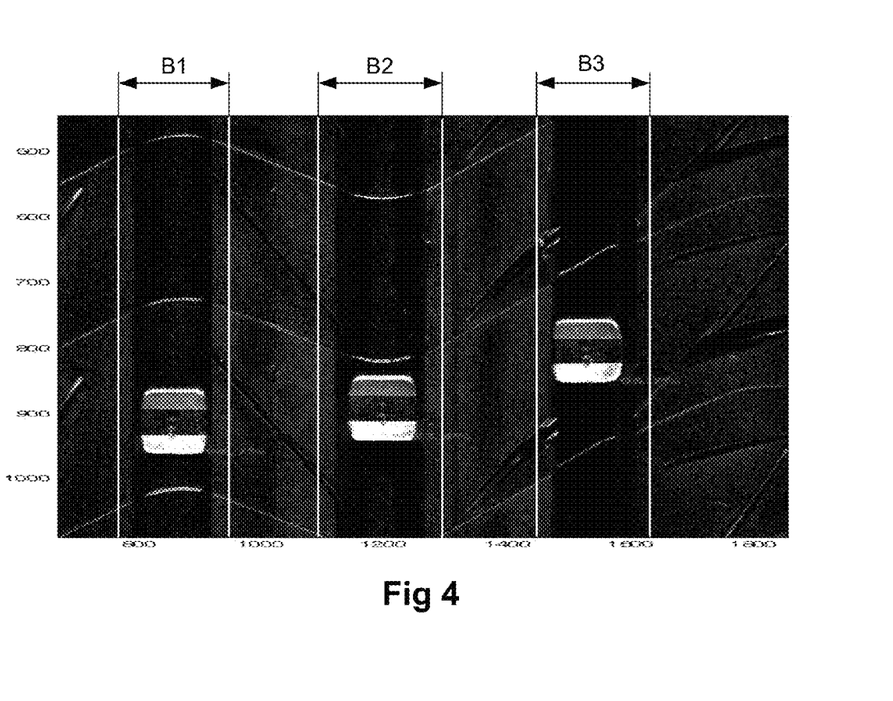
FIG. 4 represents a snapshot in 2D of the tread surface of a tyre to be inspected comprising a basic pattern comprising tread wear indicators.

The search for the tread wear indicators in the image of the circumference of the tyre to be inspected is carried out in a targeted manner by directing the search to the narrow strips substantially framing the grooves containing the tread wear indicators, and as illustrated as an example in FIG. 4 (B1, B2, B3). Each strip overlaps the image of the whole of the circumference of the tread. This targeted search makes it possible to reduce the time for processing the image and to reduce the risks of error.

The search for the tread wear indicators in these strips is carried out by searching for example for a correlation between the grey levels of the thumbnail image and the grey levels of the image of the tread surface. This method is described in detail in the publication "ELE 3700 Analyse des signaux" [ELE 3700 Signal Analysis] by the Montreal Ecole Polytechnique.

Another method better suited to the situation of the images of the tread surface in three dimensions may also be used to identify the tread wear indicators when the detail of the relief of the tread wear indicators is known.

To do this, the data extracted from the digital model used to define the relief of the tread are used. This model may be formed, for example, by the CAD digital model used to produce the curing mould.

Figure 5:
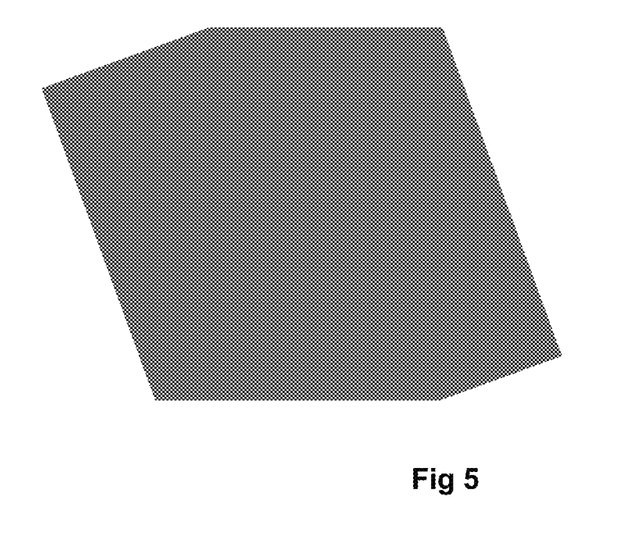
FIG. 5 represents a view originating from a 3D image of the tread wear indicators originating from the digital model that is used as a basis for defining the tread pattern of the tyre.

The shape of the contours of the tread wear indicators is then sought. It will be observed here that the shape of the tread wear indicators of the CAD model of a basic pattern containing tread wear indicators, as illustrated in FIG. 5, does not exactly correspond to the shape of the tread wear indicators as it appears on the tyre fitted and inflated on a rim. It may therefore be useful to deform this model by searching for the parameters of an affine transformation making it possible to optimize the differences in distance between the contours of the tread wear indicators originating from the CAD image and the contours of the tread wear indicators of a real image obtained on a reference tyre. This affine transformation is then stored and can be used for all the tyres of the same dimension as a starting point. It is however possible to further refine this transformation if necessary depending on each tyre to be inspected.

Figure 6:
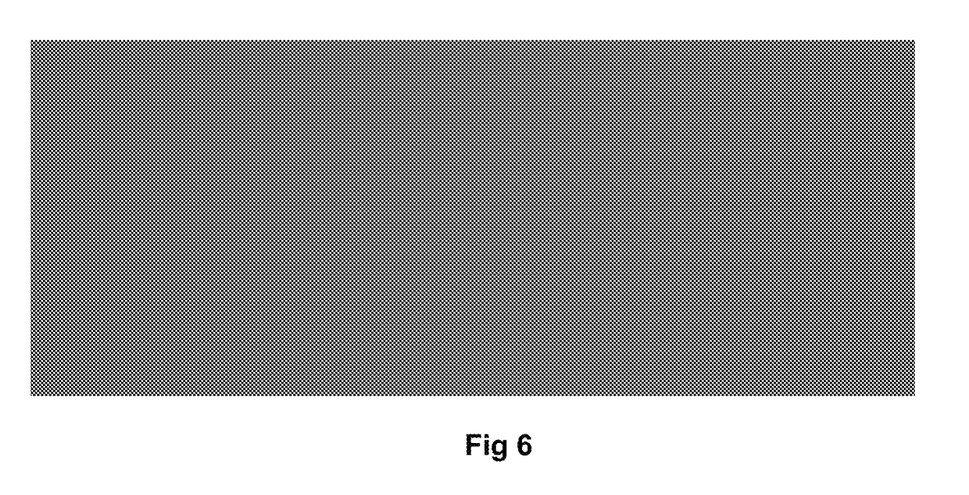
FIG. 6 represents an example of tread wear indicators marked on the 3D image of the tread of the tyre to be inspected.

The tread wear indicators are then detected by again projecting, as illustrated in FIG. 6, the shape transformed as described above of the tread wear indicators of a basic pattern onto the image of the tread and by searching for the zones of the image of the tyre tread to be inspected in which these contours are reproduced. This search can be carried out by using the same correlation method as before but this time by using the contours as a reference.

After having identified the tread wear indicators on the tread, the tread wear indicators are grouped together by sub-set. The sub-set is determined by the number and the arrangement of the tread wear indicators present on the basic pattern (U) containing the tread wear indicators.

It is therefore possible to define a zone of given dimension and known in advance in which the probability of finding tread wear indicators is high. And, for each tread wear indicator detected, assurance will be gained concerning the presence of the number and the expected position of the tread wear indicators situated close by and situated in the said zone of the predetermined shape. The object of this operation is to group together the tread wear indicators belonging to an element having as its basic pattern the basic pattern containing the tread wear indicators.

It will be observed that, in the case in which the second method of identifying the tread wear indicators is chosen, this grouping is virtually instantaneous because the search has been carried out by using a mask corresponding to the precise arrangement of the tread wear indicators in the basic pattern containing same.

Certain difficulties may occur when two basic patterns containing tread wear indicators are situated side by side. The grouping of the tread wear indicators by sub-set then requires an additional step so as to prevent incorrect groupings.

Also, when the identification of all the tread wear indicators of a sub-set has not been carried out correctly or in the situation explained in the previous paragraph, it may be useful, after having tried to carry out this step of grouping into sub-sets the tread wear indicators that are present in the image of the tread to be inspected, to carry out one or more verification operations for the purpose of eliminating the incorrect detections or the absences of detection and the incorrect groupings.

Figure 7:
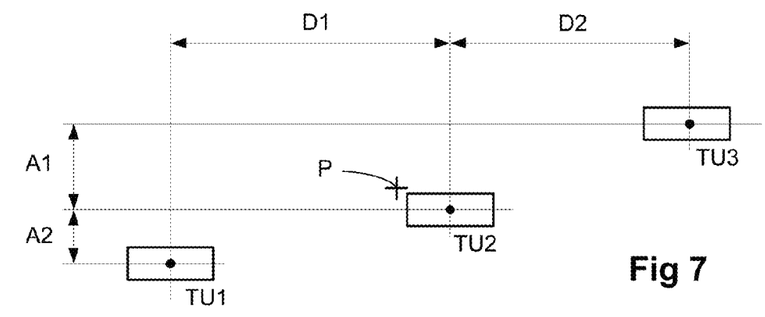
FIG. 7 illustrates an example of computing a centre of gravity of a basic pattern containing tread wear indicators.

Accordingly, for a given sub-set, the distances (A1, A2, D1, D2) signifying the respective position of the tread wear indicators as illustrated in FIG. 7 are computed.

When one or more of these distances does not correspond to the reference distances established on the basis of the position of the tread wear indicators of the basic pattern and stored as described above, it is possible to suspect a detection error and to carry out an in-depth search.

Figure 8:
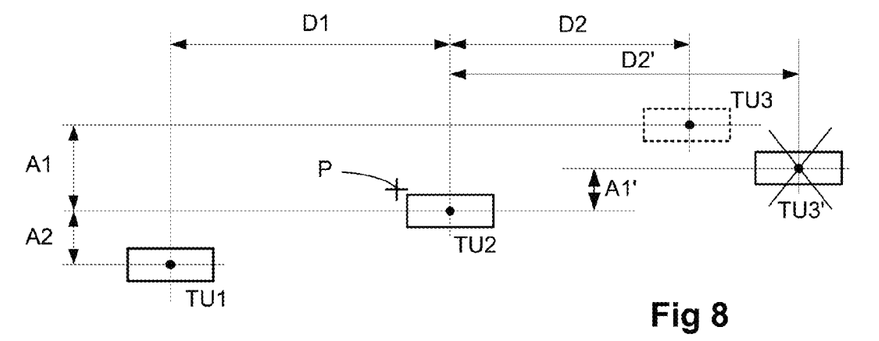
FIGS. 8 and 9 illustrate the correction operations that can be carried out in the event of a wrong detection or detection error.
Figure 9:
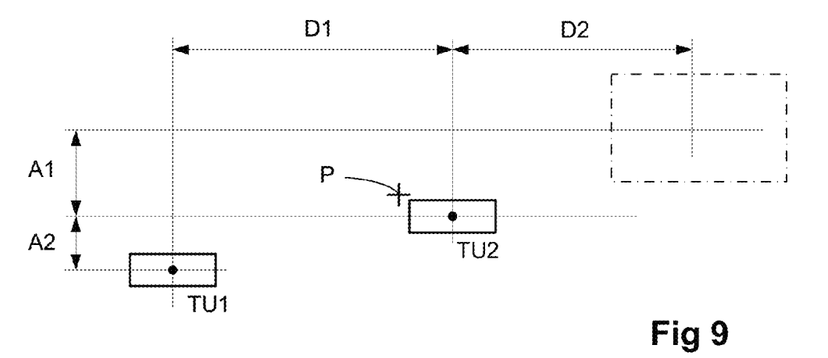

FIG. 8 illustrates the case in which a tread wear indicator (TU3') has been detected in an incorrect place. In this situation, an analysis is reinitiated of the zone in which this tread wear indicator should be, as illustrated in FIG. 9, with a lower tolerance of acceptance. The same applies when no tread wear indicator is detected in a zone where it is logically expected.

After this step of grouping the tread wear indicators into sub-sets, it is possible to compute, for each of the sub-sets, the position of the characteristic point according to the definition which has been given thereof above. Then, knowing the position of these characteristic points, it is possible to compute the circumferential distance separating them in twos.

Figure 10:
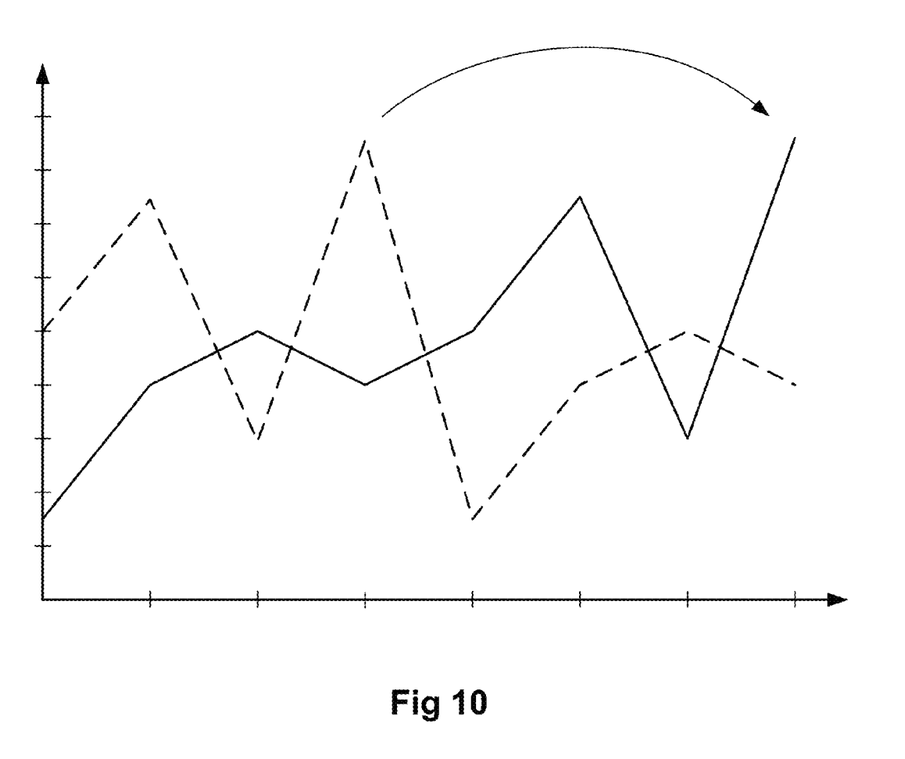
FIG. 10 illustrates the operation of synchronizing the sequences of distance between the tread pattern elements formed of a basic pattern comprising tread wear indicators.

The following step of the embodiment of the method according to the invention then consists in making the distance sequence measured on the image of the tread surface to be inspected coincide with the circumferential distance sequence that is known and stored as illustrated in FIG. 10, where it is appropriate to offset the sequence by four pitches in order to make the two sequences correspond exactly. The result of this is a matching of the characteristic points of all the elements of the tread pattern comprising tread wear indicators.

The last step of the embodiment of the method according to the invention then consists in projecting the shape of the boundary between the elements according to the known sequence of positioning of the said elements relative to one another.

Figure 11:
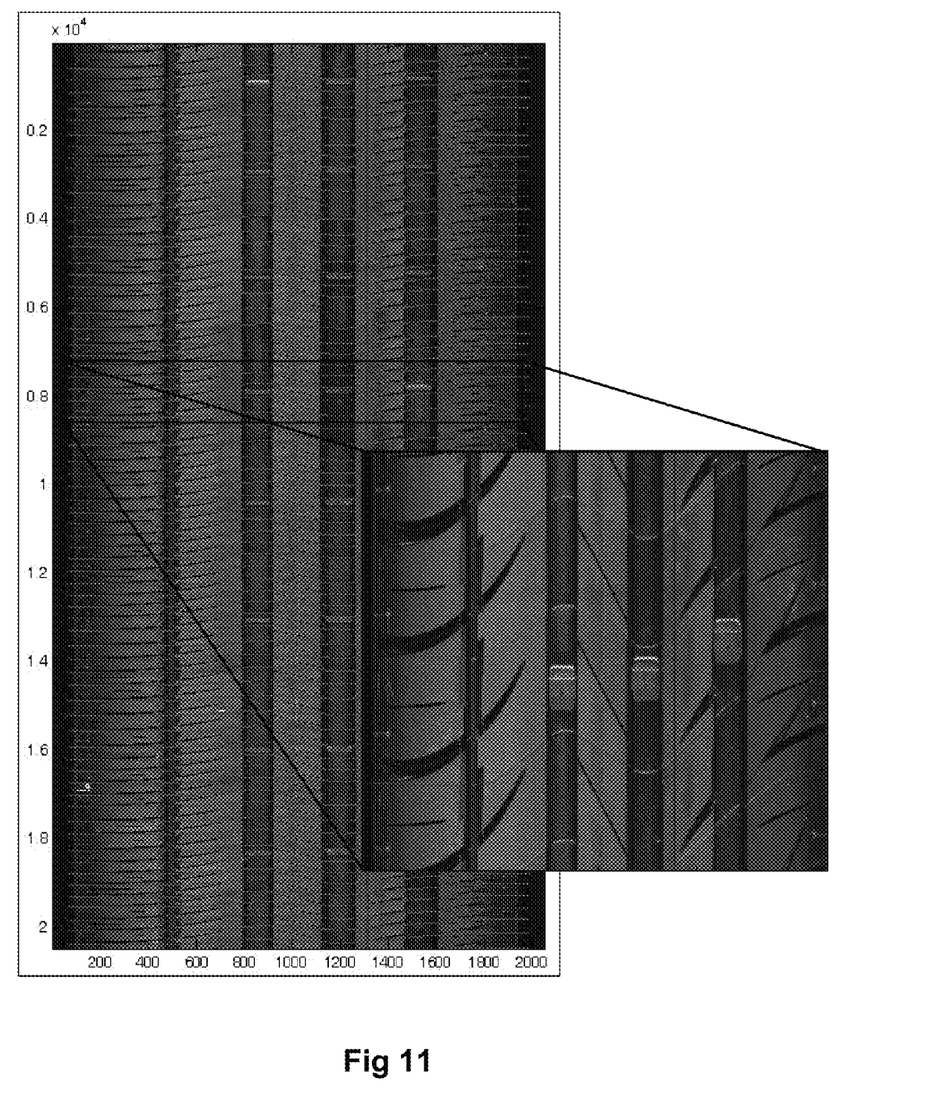
FIG. 11 illustrates the operation of projecting the boundaries between the basic patterns.

First of all the boundary of the elements comprising tread wear indicators is positioned relative to the characteristic points of each of these elements. Then, by using the known sequence of positioning of the basic patterns and the circumferential length of each of these patterns, the boundary between each of the elements forming the tread pattern of the tread to be inspected is positioned as illustrated in FIG. 11.

The method described above also provides the possibility of adjusting the transverse position of the boundaries. Specifically, it is found that, on exit from the press and more particularly during the pressurizing of the tyre fitted on a rim, the deformations of the reinforcing plies forming the belt impose transverse movements of the tread more commonly known as circumferential run-out.

The image of the tread of the tyre to be inspected reproduces these slight movements relative to the longitudinal direction. The transverse position of the boundaries should therefore be modified while taking account of this phenomenon, in particular when the inspection of the tread of the tyre to be inspected is carried out based on the tyre fitted to a rim and inflated.

Figure 12:
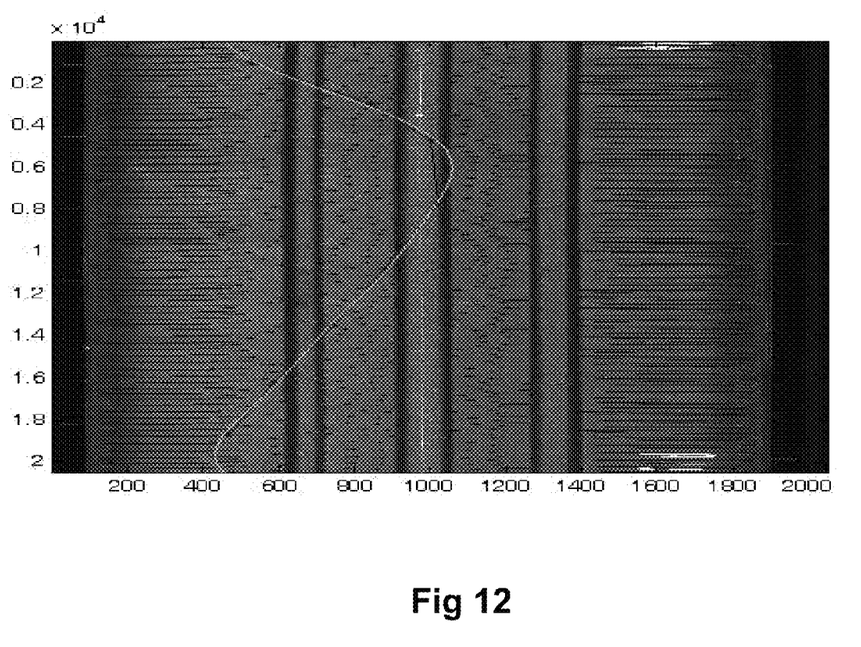
FIG. 12 illustrates the transverse variations associated with revealing the run-out of the tyre.

Accordingly, the distance between the transverse position of the characteristic points of each of the basic patterns containing the tread wear indicators and a straight line oriented in the longitudinal direction is evaluated. From the value of these distances, the transverse position of the boundary of the elements containing these tread wear indicators is then corrected. The transverse correction of the position of the boundaries of the basic elements situated between two basic elements containing consecutive tread wear indicators is corrected by extrapolation, for example in a manner proportional to the difference in the transverse distances of these two basic elements containing tread wear indicators as illustrated in FIG. 12.

After this step of determining the boundaries between the basic elements, it is possible to form image collections representing one and the same basic pattern by cutting the image of the tread surface into as many elementary zones as there are elements present in the tread pattern.

It should be noted here that this method can be applied without distinction to the case of tread patterns in which the limits between the boundaries all have identical shapes, which is the more frequent case, as in the case of the tread patterns in which the shapes of the boundaries are different from one basic pattern to another. In this case, knowing the position of the tread wear indicators makes it possible, in a manner similar to what has been explained above, to place the boundaries in a predetermined shape in the agreed position.

It may prove of value to carry out the finer resetting of the images of one and the same type of basic pattern so that patterns, characteristic points such as contour elements, or zone boundaries, previously identified, are as closely superposed as possible. This resetting is carried out by local deformation in order to cause these patterns, these contour elements or these zone boundaries to correspond.

It is then possible to compare the images of each of these collections of images with the reference image of the basic pattern that is attached to them. This reference image may be an image originating from the CAD model of the tread pattern or else an average image computed on the basis of the collection of images of a basic pattern as is described in publication WO2009077537.

The invention claimed is:

1. An inspection method for inspecting a tread of a tyre having a tread pattern formed of elements that are juxtaposed circumferentially and separated from one another by identically shaped boundaries, and having basic patterns in a number sequenced in a known manner, the basic patterns including a basic pattern on which tread wear indicators are placed that are associated a characteristic point of the basic pattern, the method comprising steps of:
   obtaining an image of a tyre tread to be inspected;
   identifying tread wear indicators present on the image;
   grouping together sub-sets of the tread wear indicators corresponding to a basic pattern that includes the tread wear indicators;
   determining characteristic points of elements of the sub-sets of the tread wear indicators;
   determining a sequence of distances by computing distances between the characteristic points of the elements of the sub-sets of the tread wear indicators;
   comparing the sequence of distances with a known sequence of distances between characteristic points of at least one basic pattern, and confirming a coincidence between the sequences; and
   projecting a shape of a boundary between elements of the at least one basic pattern onto a surface to be inspected according to the known sequence of distances between the characteristic points of the at least one basic pattern.

2. The inspection method according to claim 1, wherein the tread wear indicators are included in a single basic pattern.

3. The inspection method according to claim 1, wherein the identifying of the tread wear indicators is carried out based on reference thumbnail images of the tread wear indicators, the reference thumbnail images being adapted to a dimension of the image of the tyre tread to be inspected.

4. The inspection method according to claim 1, wherein the identifying of the tread wear indicators is carried out based on a digital model used as a basis for defining the tread pattern.

5. The inspection method according to claim 1, wherein the identifying of the tread wear indicators is limited to narrow circumferential strips substantially framing grooves of the tread pattern in which the tread wear indicators are situated.

6. The inspection method according to claim 4, wherein an image of tread wear indicators of the digital model is deformed according to calibration parameters of an imaging system used to obtain the image of the tyre tread to be inspected.

7. The inspection method according to claim 4, wherein an image of tread wear indicators of the digital model is deformed by applying an affine transformation.

8. The inspection method according to claim 1, wherein a distance between a transverse position of the characteristic points of the elements of the sub-sets of the tread wear indicators and a longitudinal direction is evaluated so as to determine a run-out of the tyre over a whole of a circumference of the tyre.

9. The inspection method according to claim 2, wherein a distance between a transverse position of the characteristic points of the elements of the sub-sets of the tread wear indicators and a longitudinal direction is evaluated so as to determine a run-out of the tyre over a whole of a circumference of the tyre.

10. The inspection method according to claim 3 wherein a distance between a transverse position of the characteristic points of the elements of the sub-sets of the tread wear indicators and a longitudinal direction is evaluated so as to determine a run-out of the tyre over a whole of a circumference of the tyre.

11. The inspection method according to claim 4, wherein a distance between a transverse position of the characteristic points of the elements of the sub-sets of the tread wear indicators and a longitudinal direction is evaluated so as to determine a run-out of the tyre over a whole of a circumference of the tyre.

12. The inspection method according to claim 5, wherein a distance between a transverse position of the characteristic points of the elements of the sub-sets of the tread wear indicators and a longitudinal direction is evaluated so as to determine a run-out of the tyre over a whole of a circumference of the tyre.

13. The inspection method according to claim 6, wherein a distance between a transverse position of the characteristic points of the elements of the sub-sets of the tread wear indicators and a longitudinal direction is evaluated so as to determine a run-out of the tyre over a whole of a circumference of the tyre.

14. Inspection method according to claim 7, wherein a transverse position of a boundary between elements is corrected as a function of a value of a run-out of the tyre at the transverse position of a circumference of the tyre.

\* \* \* \* \*